Dec. 12, 1961  W. F. FORSYTH ET AL  3,013,185
PHASE UNBALANCE PROTECTIVE RELAY
Filed Sept. 8, 1959  3 Sheets-Sheet 1

INVENTORS.
WILLIAM F. FORSYTH
FRANK J. FORSYTH,
BY
ATTORNEYS.

Dec. 12, 1961 W. F. FORSYTH ET AL 3,013,185
PHASE UNBALANCE PROTECTIVE RELAY
Filed Sept. 8, 1959 3 Sheets-Sheet 2

INVENTORS.
WILLIAM F. FORSYTH
FRANK J. FORSYTH,
BY
ATTORNEYS.

Dec. 12, 1961 W. F. FORSYTH ET AL 3,013,185
PHASE UNBALANCE PROTECTIVE RELAY
Filed Sept. 8, 1959 3 Sheets-Sheet 3

INVENTORS.
WILLIAM F. FORSYTH
FRANK J. FORSYTH,
BY
*Allen & Allen*
ATTORNEYS.

United States Patent Office 3,013,185
Patented Dec. 12, 1961

3,013,185
PHASE UNBALANCE PROTECTIVE RELAY
William F. Forsyth and Frank J. Forsyth, Pikeville, Ky., assignors to Forsyth Engineering Company, Pikeville, Ky., a partnership
Filed Sept. 8, 1959, Ser. No. 838,745
5 Claims. (Cl. 317—27)

This invention relates to the detection of serious phase unbalance in polyphase electrical systems, and relates more particularly to the provision of a protective relay operative to detect phase failure or phase unbalance, and the consequent protection of motors or other apparatus operated by the polyphase source.

The instant invention may be used as a warning system, or master control device, for large groups of motors or it may be installed on selected motors for individual protection. When installed on certain types of motors, the invention will detect a ground fault, internal short or open circuit in the motor. It may be used also on rotary converters or stationary conversion equipment to detect a phase failure, or it may be used as a tube failure protective device in a power rectifier. The invention also may be employed as a sensing system on low voltage distribution lines; and it may be readily applied to the protection of high voltage lines by the use of suitable instrument transformers.

While various forms of protective devices are currently available for such purposes, they are not extensively used because of their cost, complexity, difficulty of installation, testing problems and the like. By their past performance, many such protective devices do not enjoy the users' confidence; and they are often associated with the current transformers used for other devices and may be adversely affected by unfavorable transformer ratios or unbalance of current transformer load. Since such devices are usually employed in the high-voltage sections, the average shop electrician shows an understandable lack of enthusiasm for maintaining them.

All of this adds up to the fact that comparatively few operations utilize phase-failure or phase unbalance protective devices. In the case of poly-phase motors which are provided with thermal overload protection, the thermal devices are subject to ambient temperature changes, manufacturing tolerances, and are often mis-matched to the motor by neglect, lack of knowledge, or temporary changes in operating conditions. The commonly used two-element thermal device may fail under certain operating conditions. Consequently, when a supply line fuse blows, or the high-voltage current suffers from what is called a "single phase," there may be considerable damage to the motors.

Accordingly, a principal object of the instant invention is the provision of a simple yet highly effective protective relay better adapted to meet the requirements of practice than those devices which are currently available.

A further object of the instant invention is the provision of a protective relay which is located in the comparatively safe low-voltage section, although the device may be readily used in the high-voltage section by obvious modifications.

Still a further object of the invention is to provide a protective device which operates with a high degree of effectiveness and efficiency, which may be operated, adjusted and maintained by ordinary shop electricians, and which may be utilized in complete confidence.

The foregoing together with other objects of the invention which will be pointed out hereinafter, or will be apparent to one skilled in the art upon reading these specifications, we accomplish by those constructions and arrangements of parts of which we shall describe certain exemplary embodiments, reference being now made to the accompanying drawings wherein.

In accordance with the instant invention, we employ the harmonics of a polyphase rectifier to detect phase failure or phase unbalance. It has been found that the introduction of an unbalance in the voltage supply of a polyphase rectifier will produce one or more new and lower frequencies or harmonics which are indicative of the degree of voltage unbalance. By monitoring the output of the rectifier, we are able to readily detect phase unbalance and, upon detection, take appropriate steps to protect equipment served by the unbalanced source.

Figure 1:
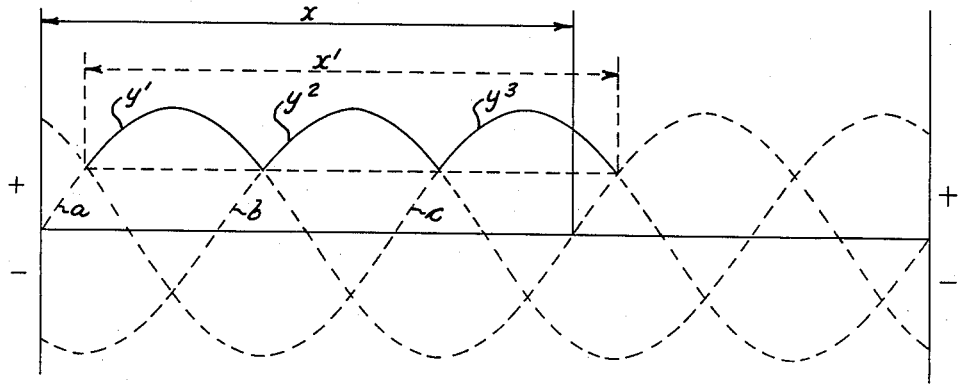
FIGURE 1 is a diagrammatic illustration of a three phase alternating current.

To explain more fully, in a perfectly balanced three phase, one-half wave rectifier, the envelope will be repeated three times during the completion of one cycle of voltage; and the minimum frequency will be three times the supply voltage frequency. This is illustrated in FIGURE 1 wherein the dotted lines $a$, $b$, and $c$ illustrate the three phase source of supply, and the distance $x$ represents one complete cycle. The output of the rectifier is represented by the three identical ripples $y^1$, $y^2$, $y^3$; and it will be noted that the distance $x'$ equals the distance $x$, which represents one cycle of voltage. It follows that a minimum ripple frequency of 180 cycles will be present in a three phase rectifier using three phase, 60 cycle balanced source, or for a six phase rectifier, 360 cycles will be a minimum frequency of the rectifier wave if the three phase source is 60 cycles since each ripple will have repeated itself exactly three or six times during one cycle of the 60 cycle source.

Figure 2:
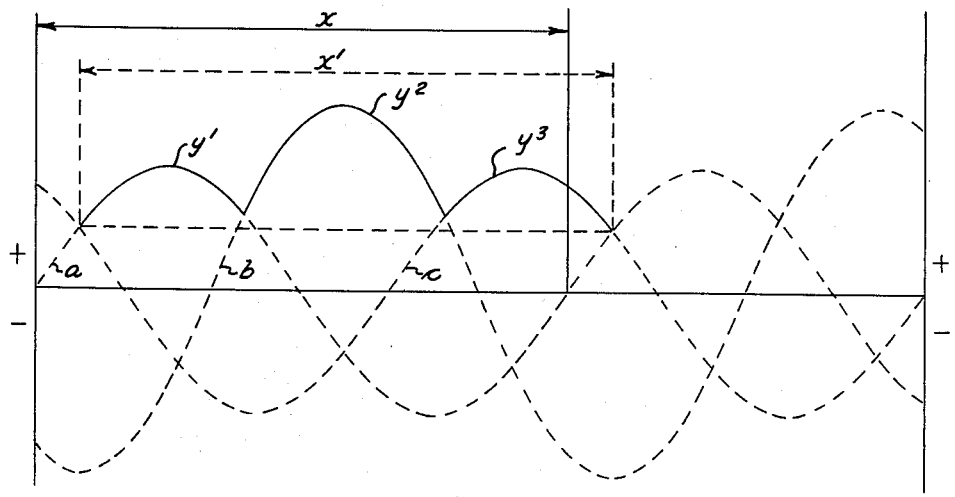
FIGURE 2 is a diagrammatic illustration of an unbalanced three phase alternating current.

If there is an unbalance in the supply voltage, i.e. an unbalance in one leg of the three phase source, then the period of the envelope will change and each ripple will be different. Thus, with reference to FIGURE 2, if the $b$ phase voltage should be larger than the other two voltages, the $y^2$ ripple will also be larger than the $y^1$ and $y^3$ ripples, which will become mirror images. When this happens, then all three ripples will form a new wave which will repeat itself in the same period as the source voltage. However, since each ripple, previously identical, now resolves itself into an envelope which must include three former ripples before it can repeat itself, the period of the envelope becomes three times as long and the lowest frequency is only one-third of the former minimum frequency. Thus, in the case of six phase bridge rectifier, an unbalance frequency would be one-third its normal minimum frequency.

In analyzing the harmonic output of both three phase and six phase rectifiers with unbalanced line voltages, it has been found that a simple linear correlation exists between the second harmonic and the negative sequence voltage. This may be seen by comparing FIGURES 3 and 4 wherein the response of a three phase and a six phase rectifier have been plotted, using the negative sequence voltage as a base. In the equilateral voltage triangle shown as NMO, FIG. 3 and FIG. 4, the closed system of sine wave voltages derived from any polyphase current or voltage and shown as NO, OM', M'N are made to vary with point M' moving from M to S, S to O and back to point M along arc OM which is the arc of a circle with radius center at N. The voltages NO, OM' and M'O are then fed to the 3-phase rectifier as phase voltages and to the 6-phase rectifier as line voltages and the harmonic magnitudes of each rectifiers output computed for each position of M' on its locus. These harmonic magnitudes for each position of M' were then plotted versus the negative sequence voltage of each voltage triangle ON, NM' determined by M' to produce the shaded areas (response curves) of FIG. 3 and FIG. 4. It is apparent that all possible voltage triangles can be similarly duplicated by placing one side on line NO and letting the 3rd corner fall in the shaded area MS arc OM. Thus the response areas generated by M' as it moves along the closed locus MS arc OM must enclose the response of all other possible triangles.

Figure 3:
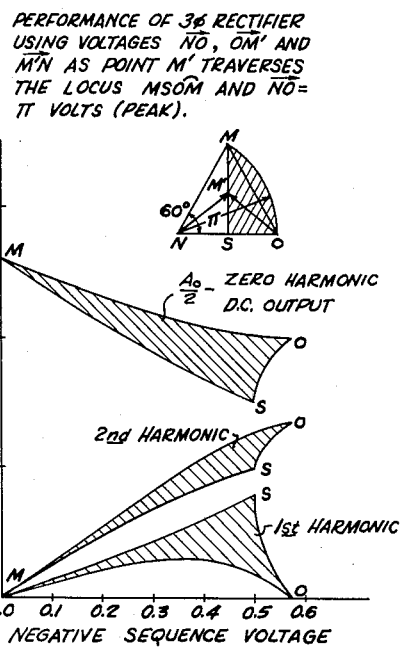
FIGURE 3 is a graph illustrating the response of a three phase rectifier to unbalanced line voltages, using the negative sequence voltage as a base.
Figure 4:
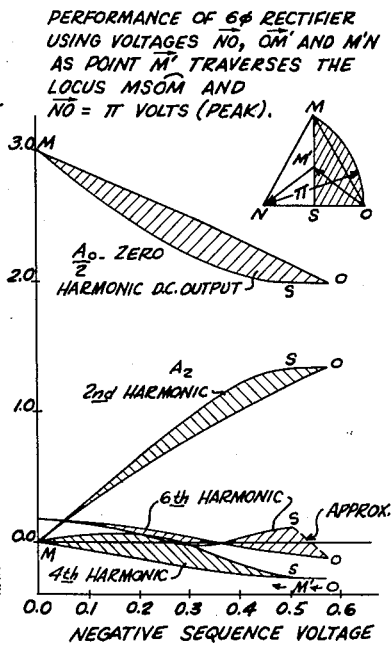
FIGURE 4 is a graph illustrating the response of a six phase rectifier to unbalanced line voltages, using the negative sequence voltage as a base.

As will be evident from FIGURES 3 and 4, a six phase rectifier has inherent advantages in terms of negative sequence voltages in that the harmonics are widely separated, thereby readily permitting a simple tuneable response system. In addition, there is less magnetizing effect on the voltage system being used. For a given value of negative sequence voltage, the second harmonic upper and lower responses are associated with a corresponding lower and higher D.-C. voltage output, thus offering the opportunity to decrease error in negative sequence voltage for a given response by using the D.-C. with the differential response in an additive manner. The three phase rectifier has its own inherent advantages in that the first and second harmonic responses can be used to accurately locate voltage triangles; and a comparison of its curves shows it to possess the features for using the D.-C. output and second harmonic in a subtractive manner for accurate negative sequence voltage values. In general, the three phase rectifier has a superior range of linearity with respect to negative sequence voltage. In either case, the degree of differential used with D.-C. output will affect the range of accuracy.

In the light of the foregoing, three forms of the device are possible: the first employing the features of the six phase rectifier (additive), the second using the current from differential voltage without D.-C. correction (differential), and the third utilizing the features of the three phase rectifier in a subtractive fashion (subtractive).

Figure 5:
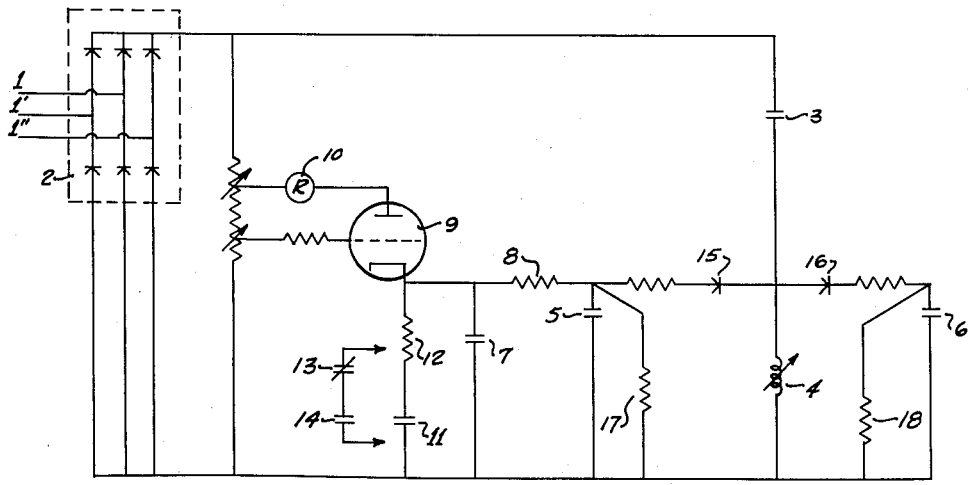
FIGURE 5 is a schematic drawing of a protective relay in accordance with the instant invention.

Referring now to FIGURE 5, we have therein illustrated a device effective to exploit negative sequence voltage sensitivity in an additive manner. As seen therein, a three phase supply is shown at 1, 1', 1", such supply being connected to a six phase bridge rectifier 2. Condenser 3 and variable inductor 4 form a resonant circuit tuned to the second harmonic in the ripple of rectifier 2. As unbalance appears, condenser 3 and variable inductor 4 start to oscillate and build up a D.-C. voltage across condensers 5 and 6 which in turn charge condenser 7 through resistance 8, which in turn acts to charge tube 9. When the charge reaches a predetermined level set by the grid and plate voltages, the tube 9, closes relay 10 which is "locked in" through contact 11 and its protective resistor 12. The relay 10 acts through a set of contacts 13 and 14 to control a master switch effective to deenergize the motor or the like supplied by the three phase supply line 1, 1', 1".

Condenser 7 and resistance 8 primarily form a time delay circuit, whereby voltage surges during transient switching are prevented from causing tube 9 to fire. Condensers 5 and 6, together with rectifiers 15 and 16 act as dampers; and resistors 17 and 18 act as bleeder resistance to discharge condensers 5 and 6 after transient charging.

As will be evident from FIGURE 5, the condensers 5 and 6 and their accompanying rectifiers and resistors may be used as a voltage doubler to raise the signal level. Under average conditions, one half of the damping section is not required.

Figure 6:
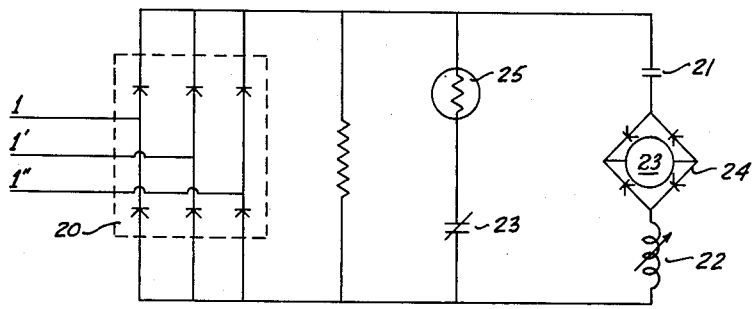
FIGURE 6 is a schematic drawing of an alternative embodiment of the invention.

In FIGURE 6 of the drawings, we have illustrated an alternative embodiment of the invention utilizing differential current. As seen therein, the six phase rectifier 20 monitors the three phase line; and when an unbalance occurs, the condenser 21 and inductor 22, which has been tuned to the second harmonic, will start to oscillate. As the unbalance increases, the second harmonic current, which is proportional to the differential voltage, will increase. This current is made to pass through relay 23 as a D.-C. current by virtue of the full wave rectifier 24 bridging it to condenser 21 and inductor 22. The relay 23, being a D.-C. relay, can be made to close for small values of current. When relay 23 closes, the circuit of thermal relay 25 is closed; and if relay 23 remains closed long enough to cycle the thermal relay, its contacts can be arranged to control a master switch, or the like, for the protection of the monitored circuit. In any tuned undamped resonant circuit, the transient oscillation caused by a voltage surge—such as the starting of a motor protected by the relay—results in a sudden D.-C. voltage output from the rectifier and agitates the resonant system thus producing the same harmonic it is intended to detect, depending on the degree of damping (resistance). The thermal relay 25, is provided to neutralize the effect of the transient second harmonic produced in the tuned circuit and occurring in the resonant system alone, and not because of the second harmonic produced by the polyphase rectifier under steady-state unbalanced voltage conditions. In the absence of effective armature damping for relay 23, thermal relay 25 is provided to prevent this short-duration harmonic produced by the surge from interfering with utilization of the steady-state harmonic from the polyphase rectifier.

Figure 7:
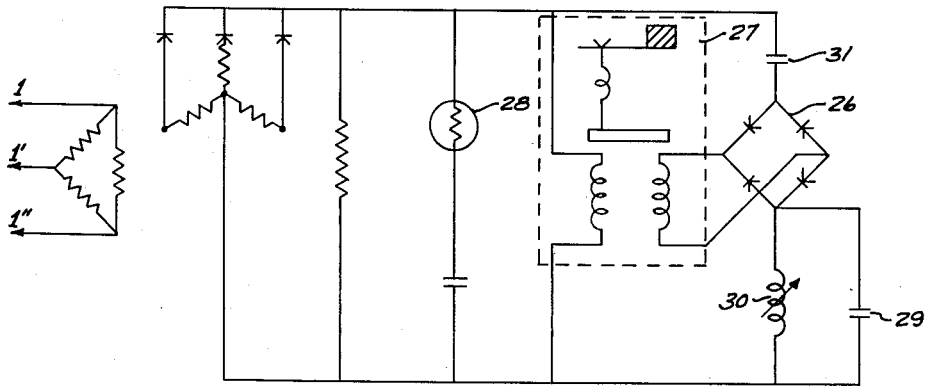
FIGURE 7 is also a schematic drawing of still another embodiment of the invention.

A subtractive type relay is shown in FIGURE 7 wherein transformers are employed to convert the monitored line voltages to phase voltages for the three phase rectifier supply. In operation, the D.-C. output of the three phase rectifier 26 feeds one coil of the differential relay 27 while the other coil is counterbalanced by a spring under tension plus the differential current from the resonating section which is applied to the second coil. When unbalanced appears, the spring tension plus the pull of the second harmonic current coil will open the differential relay which, in turn, closes the circuit to the thermal relay 28 after a short delay. The contacts of the thermal relay, as before, can be made to open or close a master circuit, as desired.

In the resonating circuit, a condenser 29 may be employed paralleling the inductor 30 to block the third harmonic present to a large degree in the three phase rectifier. The total circuit is tuned to resonate at the second harmonic frequency; the total circuit comprising the series condenser 31, the current coil of relay 27, and the paralleled condenser 29 and inductor 30. The D.-C. coil in the relay 27, using the D.-C. output from the rectifier, also acts as an undervoltage device. Adjustment of the spring tension controls the level of response for tripping the relay.

The instant invention may be easily adapted to single phase or phase unbalance protection of three phase or six phase synchronous converters by using any set of three phase voltages feeding the A.-C. rings, or by using the D.-C. brush output and applying this output directly to any pair of monitoring leads in the relay device shown in FIGURE 5. By means of this latter arrangement the relay will remain independent of the converter-voltage polarity because of the full wave bridge in the relay. Furthermore, an added advantage is that transient disturbances will trip the relay when there is heavy arcing at any A.-C. ring.

For ordinary power rectifiers, the relays may be tuned to the first harmonic and so used as a tube failure relay. The differential relay also may be used as an effective grounding relay on a floating neutral system such as a Y- connected motor, provided the neutral or any two line voltages are displaced so as to provide a new balanced voltage system; and if a dual voltage motor is used with its higher voltage connections, the relays can be used to monitor line conditions as well as winding conditions.

Additional modifications such as improved filtering and amplification undoubtedly will occur to the skilled worker in the art and consequently we do not intend the invention to be limited excepting in the manner set forth in the claims which follow. As should now be apparent, our relays, in their basic aspects, contemplate the provision of a tuned circuit responsvie to the harmonics produced by a polyphase rectifier upon the introduction of an unbalance in the voltage supply to such rectifier.

Having thus described our invention in certain exemplary embodiments, what we desire to secure and protect by Letters Patent is:

1. In a protective relay for detecting voltage unbalanced in a closed polyphase source of current, a single rectifying means adapted to be connected to the polyphase source, a first circuit connected to said rectifying means and energized by the output thereof, the output of said rectifying means producing a unified signal consisting of a fixed fundamental frequency and a plurality of harmonic frequencies when said polyphase source is in balance, said frequencies being variable upon the introduction of voltage unbalance in said polyphase source, a tunable detector in said first circuit monitoring the output of said rectifying means, said detector being tuned to a selected harmonic frequency generated by said rectifying means, a control circuit coupled to said detector, said control circuit being energized by said detector upon excitation thereof by variations in the magnitude of the said selected harmonic frequency, said control circuit including a control relay adapted to be closed upon excitation of said control circuit, and means for connecting said control relay to a means, such as a master switch, effective to interrupt the supply of said polyphase current to equipment protected by said relay.

2. The relay device claimed in claim 1 wherein said rectifying means comprises a six-phase bridge rectifier, wherein said detector is tuned to the second harmonic frequency of the output of said rectifier, and wherein said control circuit includes time delaying means operative to prevent transient voltage surges from energizing said control relay.

3. The relay device claimed in claim 1 wherein said rectifying means comprises a three-phase one-half wave rectifier, and wherein said control relay comprises a thermal relay operative to render the device unresponsive to transient voltage surges and a differential relay operatively connected to said thermal relay.

4. In a protective relay for detecting voltage unbalance in a closed three-phase source of current, a six-phase rectifier adapted to be connected to the three-phase source, a first circuit coupled to said rectifier and energized by the output thereof, the output of said rectifier producing a unified signal consisting of a fixed fundamental frequency and a plurality of harmonic frequencies when said three-phase source is in balance, such frequencies being variable upon the introduction of voltage unbalance in said source, a tunable detector in said first circuit monitoring the output of said rectifier, said detector being tuned to the second harmonic frequency generated by said rectifier, a control circuit coupled to said detector, said control circuit being energized by said detector upon excitation thereof by variations in the magnitude of the said second harmonic frequency, said control circuit including relay means operative upon excitation of said control circuit to interrupt said three-phase source of current, as by actuating a master switch controlling the operation of equipment powered by said three-phase source.

5. The relay device claimed in claim 4 wherein said relay means includes a thermal relay operative to render the device unresponsive to transient voltage surges.

References Cited in the file of this patent

UNITED STATES PATENTS

| | | |
|---|---|---|
| 1,821,342 | Hellmund | Sept. 1, 1931 |
| 2,177,900 | Logan | Oct. 31, 1939 |
| 2,384,375 | Hayward | Sept. 4, 1945 |